Dec. 16, 1941.     H. G. MOORE     2,266,612
CONTROL SYSTEM
Filed July 13, 1940     2 Sheets-Sheet 1

Inventor:
Harold G. Moore,
by Harry E. Dunham
His Attorney.

Dec. 16, 1941.     H. G. MOORE     2,266,612
CONTROL SYSTEM
Filed July 13, 1940     2 Sheets-Sheet 2

| POSITION CONTROLLERS 15 and 16 | LB1 81a | LB2 89 | B1 88 | LB3 90 | C 73 | P 108 | S 92 | G 109 | B2 127 | B3 48 | B4 124 | FF 40a | Brushes 64 & 66 |
|---|---|---|---|---|---|---|---|---|---|---|---|---|---|
| OFF 15 | | | ● | | | | ● | | ● | ● | ● | ● | B |
| Switching 15 | ● | ● | | ● | | | ● | | | | | | A |
| Series 15 | ● | ● | | ● | ● | | ● | | | | | | A to B |
| " 15 | ● | ● | | ● | ● | | ● | | | | | | B |
| Parallel 15 | ● | ● | | ● | ● | ● | | ● | | | | | B |
| " 15 | ● | ● | | ● | ● | ● | | ● | | | | | B to A |
| " 15 | ● | ● | | ● | ● | ● | | ● | | | | | A |
| Coasting 16 | | | ● | | | | ● | | ● | ● | ● | ● | A |
| " 16 | | | ● | | | | ● | | ● | ● | ● | ● | A to B |
| Breaking 16 | | | ● | | ● | | ● | | ● | ● | ● | ● | A to B |
| " 16 | | | ● | | ● | | ● | | ● | ● | ● | ● | B |

Inventor:
Harold G. Moore,
by Harry E. Dunham
His Attorney.

Patented Dec. 16, 1941

2,266,612

UNITED STATES PATENT OFFICE 2,266,612

CONTROL SYSTEM

Harold G. Moore, Wesleyville, Pa., assignor to General Electric Company, a corporation of New York Application July 13, 1940, Serial No. 345,342

18 Claims. (Cl. 172—179)

My invention relates to control systems for electric vehicles such as electric railway cars and the like, particularly to control systems provided with dynamic braking and has for its object a simple and reliable system having series parallel control during motoring operation, and having also dynamic braking.

More particularly, my invention is an improvement over the control system described and claimed in U. S. Patent No. 2,120,954, issued on June 14, 1938, to Jacob W. McNairy. In carrying out my invention in one form, I provide series parallel operation of the motors during motoring operation, together with dynamic braking with parallel connections of the motors. Variable resistances operated by an air motor are provided for controlling the acceleration of the motors and also for controlling the dynamic braking.

I have also provided a special resistance which is connected in circuit with the motors during the spotting operation preliminary to dynamic braking which resistance is short circuited to start the dynamic braking.

I have also provided a dynamic holding brake operation for use on descending grades. In using this feature, the operator adjusts the speed of the car by means of auxiliary brakes to the speed at which he desires to descend the grade and the car is thereafter dynamically braked to maintain this speed substantially constant until the bottom of the grade is reached.

Figure 1:
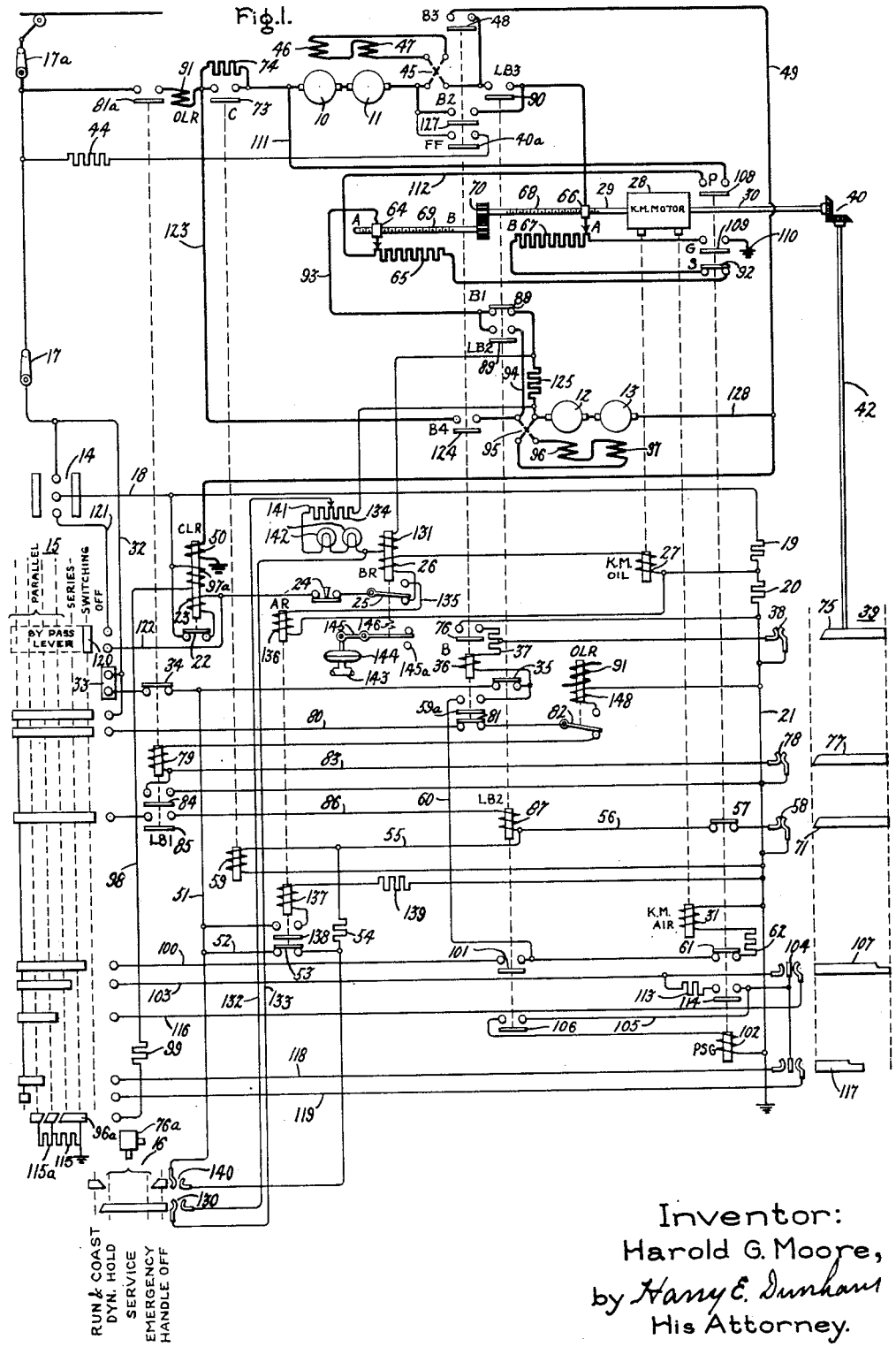
Figures 2, 3:
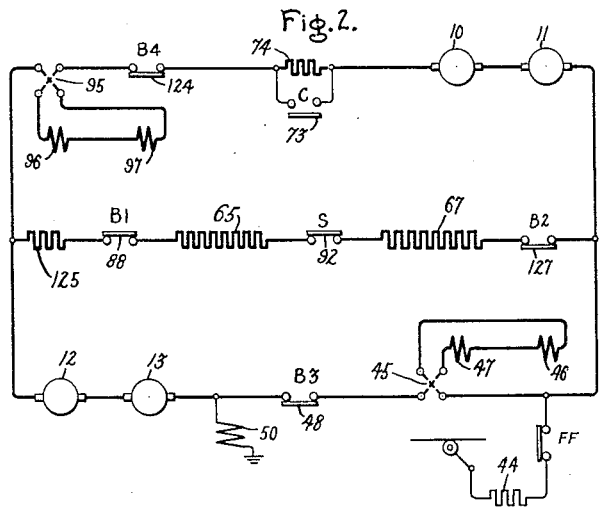

For a more complete understanding of my invention, reference should be had to the accompanying drawings, Fig. 1 of which is a diagrammatic representation of a traction motor control system embodying my invention; Fig. 2 is a simplified diagram showing the connections during dynamic braking; while Fig. 3 is a sequence table of the main contactors.

Referring to the drawings, I have shown my invention in one form as applied to a direct current traction system for trolley cars. The four series direct current motors, 10, 11, 12 and 13 are controlled by means of a manually operating reversing controller 14, a manually operated master controller 15 which preferably, as shown, is a drum type controller and by a manually operated braking controller 16, shown as a rotatable controller having cams arranged to operate switches normally biased to closed positions. By means of these three controllers, the direction of operation in the motors, their speed during motoring operation and the dynamic braking operation of the motors is controlled. I also provide a current limit relay CLR for automatically limiting the current during acceleration and a braking current limit relay BR for automatically limiting the current during dynamic braking.

*Motoring operation preliminary circuits*

With the car at rest and all devices deenergized, assume that the reversing controller 14 is turned to the forward position and that the switches 17 and 17a in the control and power circuits are closed, the controllers 15 and 16 being in their off positions shown.

The switch 17 closes a control circuit from the trolley through the switch, the reversing controller 14, the wire 18, the 500 ohm resistance 19 and the 850 ohm resistance 20 to the ground wire 21. Also a circuit is established in parallel with the resistance 19, this circuit leading from the wire 18 through the CLR relay switch 22, the regulating coil 23 of the relay, the normally closed push button holding switch 24, a normally closed switch 25 of the BR relay, the regulating coil 26 of the BR relay, the KM oil coil 27 and through the resistance 20 to ground. The KM oil coil 27 thus energized picks up its armature and opens an oil valve in a compressed air KM motor or operating device 28.

This device is similar in construction to the device 24 disclosed in U. S. Patent No. 2,120,954, issued on June 14, 1938, to Jacob W. McNairy. It comprises a vertical cylinder containing a piston which operates a rack. Upon movement of the piston, a pinion engaging the rack turns the shafts 29 and 30. These shafts may in fact be integral in the form of a single shaft.

The admission of compressed air to move the piston is controlled by a KM air coil 31. When this coil is deenergized, an air valve is open and air under pressure is admitted to the top of the piston so that the piston is moved downward. When the coil 31 is energized, an air valve is opened to admit compressed air to a chamber containing a quantity of oil which is forced against the bottom of the piston to raise it. It will be understood that by means of suitable valves the compressed air is at the same time selectively exhausted to provide for this movement. The movements of the piston are furthermore controlled by a normally open valve controlling the flow of the oil under the piston. This valve is operated by the KM oil coil 27. When the KM coil 27 is deenergized, the flow of oil is shut off and the piston cannot move. Energization of this coil opens the oil valve and, therefore, controls the movement of the piston. The functions of the KM operating device 28 will be described in detail hereinafter in connection with the operation of the system.

Also at this time a circuit is closed from the switch 17 through the wire 32, the master control contact 33, the LB1 interlock switch 34, the LB2 interlock switch 35, the B coil 36, part of the resistance 37, the normally closed switch 38 of the KM motor controller 39 to the ground wire 21. This KM controller 39 is a cam and switch rotary type controller. It is driven by the KM motor device 28 through the shaft 30, the gears 40 and the shaft 42 connected to the controller 39.

The B coil 36 which is now energized picks up its armature and actually establishes braking connections for the motors although these connections are not effective at this time. The auxiliary FF contact 40a, however, is closed by this coil 36 and establishes a flashing circuit for the fields of the motors. This circuit leads from the main power switch 17a which is closed through a 168 ohm resistance 44, the switch FF, the field reversing switch 45 through the fields 46 and 47 of the motors 10 and 11, the field reversing switch 45, the B3 switch 48 which was closed by the coil 36, the wire 49 and the CLR coil 50 to ground.

Also current flows from the wire 32 through the contact 33, the switch 34, the wire 51, the wire 52, the AR switch 53 which is now closed, a 2000 ohm resistance 54, wire 55, wire 56, PSG switch 57 and the normally closed switch 58 of the controller 39 to the ground wire 21. It will be noted that at this time the PSG switch 57 and the switch 58 short circuit the C operating coil 59.

The closure of the B switch 59a also closes a circuit as previously traced through the switch 35, and then through the switch 59a, conductor 60, the normally closed PSG switch 61, a 2000 ohm resistance 62, and through the KM air valve coil 31 to the ground wire 21. The coil 31 causes the KM operating device 28 to move the contact arm or brush 64 toward the right over its resistance 65 and the brush 66 toward the left over its resistance 67. As shown diagrammatically, these brushes are secured to travelling nuts which are moved by a screw shaft 68 connected to the shaft 29 and a second screw shaft 69 connected to the shaft 68 through a reversing gearing 70.

As the KM motor 28 starts operating, the cam 71 on the controller 39 is turned to open the switch 58 whereby the short circuit around the C coil 59 is opened. The coil 59 thereupon picks up its armature and closes the C switch 73 which short circuits a resistance 74 in the motor circuit.

Also as the controller 39 continues its movement its cam 75 opens the switch 38 whereby the remainder of the resistance 37 is placed in circuit with the B coil 36, the circuit leading through the resistance 37, the B interlock switch 76 which is now closed to the ground wire 21.

*Master controller 15 in switching position*

These circuits are set up preparatory to the starting of the motors. As yet the motor circuit is not closed. To start the car the braking controller 16 is turned to the run and coast position whereby the air brake valve 76a is turned to release the air or other mechanical brakes on the car. Finally the master controller 15 is turned to the switching position, the series position or to any one of the four parallel positions indicated on the drawings.

Assuming that the master controller 15 is turned to the switching position, the circuit through the contact 33 is opened and, therefore, the B coil 36, the C coil 59 and the KM air coil 31 are all deenergized. With the coil 31 deenergized, the KM motor 28 reverses and moves the brushes 64 and 66 back to their original A positions. This high speed movement of the brushes is carried out in a short time, such as one second or less. When the brushes reach the A positions and the controller 39 has returned to its off position, the cam 77 on this controller closes its switch 78 which closes the circuit for the LB1 coil 79. This circuit leads from the wire 32 through the master switch 15 to the wire 80, the B interlock switch 81, the OLR relay switch 82, the LB1 coil 79, the wire 83 and the switch 78 to the ground wire 21. The LB1 coil 79 now closes its LB1 switch 81a in the motor circuit and also closes its interlock switch 84 which bypasses the switch 78. This provides for subsequent movement of the controller 39 and opening of the switch 78 without deenergization of the coil 79.

Also the LB1 coil 79 closes its interlock switch 85 whereby a circuit is established through the master controller 15, the switch 85, conductor 86, the LB2 operating coil 87, the wire 56, PSG interlock switch 57 and the controller 39 switch 58 to the ground wire 21. The LB2 coil 87 operates to open its switch B1 88 and close its switches LB2 89 and LB3 90.

This completes the power circuit for the motors. This circuit leads from the switch 17a through the LB1 switch 81a, the OLR coil 91, the resistance 74, the C switch 73 being open, the armatures of the motors 10 and 11, the reversing switch 45, the fields 46 and 47, the reversing switch 45, the LB3 switch 90, the brush 66, resistance 67, the S switch 92 which is closed, the resistance 65, conductor 93, LB2 switch 89, conductor 94, the reversing switch 95, the fields 96 and 97 of the motors 12 and 13, reversing switch 95, the armatures of the motors 12 and 13 to the conductor 49 and thence through the CLR coil 50 to ground. The motors are thus connected in series with each other and with the total amounts of the accelerating resistances 65 and 67 in series with them. These low speed connections obtain until the master controller 15 is advanced.

It will be understood that the reversing switches 45 and 95 are suitably operated by the reversing controller 14.

*Master controller 15 in series position*

Assuming that the master controller 15 is now moved to the series position, a circuit is completed by the segment 96a of the controller 15 for the coil 97a of the CLR relay. This circuit leads from the conductor 18 through the coil 97a, the conductor 98, a control resistor 99 and the segment 96a to ground. This energization of the coil 97a lowers the operating point of the relay to a predetermined low value such as 129 amperes in the current coil 50. It will be understood that the two voltage coils, i. e., the regulating coil 23 and the rate coil 97a act on the common armature in the same direction as the current coil 50, the armature being biased by gravity or a spring to a lowermost position, as shown, with the switch 22 closed.

A circuit is also completed through the KM air valve coil 31, this circuit leading through the master controller to the conductor 100 through the LB2 interlock switch 101 which is now closed, the PSG switch 61 and the KM coil 31 to the ground conductor 21. The energization of the coil 31 causes operation of the KM motor 28, the KM oil coil 27 being energized, in such a direction that the brushes 64 and 66 are driven toward their B positions.

As soon as the brush arms start moving, the cam 71 of the KM controller 39 opens the switch 58 and thereby inserts the C coil 59 in series with the LB2 coil 87. The coil 59 thereupon closes the C switch 73 which short circuits the resistance 74. This has the effect of increasing quickly the accelerating current to a higher value.

As the brushes 64 and 66 move, they reduce the amount of the resistances in the motor circuit and increase rapidly the motor current for rapid acceleration of the motors. This movement of the brushes, however, is controlled by means of the current coil 50 to limit the motor current to a predetermined maximum, such as 129 amperes previously assumed. When this current is exceeded, the coil 50 with the assistance of the coils 23 and 97a holds the CLR relay switch 22 open thereby opening the circuit of the KM oil coil 27 and stopping the KM motor 28. Thereafter, when the current has dropped to a somewhat lower value, the switch 22 closes to again energize the coil 27 and start the motor 28.

It will be understood that when the CLR relay opens its switch 22, the coil 23 is thereby deenergized whereupon the switch 22 recloses. The result is that the relay contact rapidly opens and closes with a vibrating action similar to an electric bell or buzzer. As the current in the coil 50 increases, however, this coil exerts an increased pull on the armature and thereby prevents the switch 22 from reclosing so quickly in accordance with its bias. Thus as the current in the coil 50 increases, the relative proportion of the time that the switch 22 is open increases until finally it is held open by the two coils 50 and 97a.

The KM oil coil 27 is deenergized and energized along with this CLR relay coil 23. As the proportion of time that the coil 23 is energized decreases, the proportion of time that the coil 27 is energized decreases and the average speed of the KM motor 28 decreases. Actually the mass of the armature and part of the valve moved by the coil 27 and a spring (not shown) are arranged so that the armature assumes a position of partial valve opening which is a function of the average value of the pulsation of current through the coil.

The result is that the maximum accelerating current and hence accelerating rate is quickly attained and then held substantially constant until the brush arms reach their B positions. Here the motor current flows directly through the four motors in series without any accelerating resistance in the circuit. This is the high speed series connection.

*Master controller 15 in parallel positions*

Assume that the master controller 15 is now advanced to its first parallel position, a circuit is closed through the PSG operating coil 102, this circuit leading through the master controller to the wire 103 through the controller 39 switch 104, the wire 105, LB2 switch 106, the coil 102 to the ground wire 21. The switch 104 is arranged so that it is closed by the cam 107 to connect conductors 103 and 105 only when the controller 39 is moved to its extreme position with the contact arms in their B positions.

The coil PSG now closes its switches P108 and G109 and opens its switch S92. This effects a bridge type of transition to parallel without interruption of current through the motors, as described in U. S. Patent No. 1,434,758, issued on November 7, 1922, to John F. Tritle.

The motor circuit is now through the motors 10 and 11 as before to the contact arm 66 which is in the B position and thence through the resistance 67 and through the G switch 109 to the ground 110. The parallel motor circuit leads through the conductor 111, the P switch 108, conductor 112, the resistance 65, the contact arm 64 which is in its B position, the conductor 93, LB2 switch 89, the reversing switch 95, the motor fields and armatures and through the CLR coil 50 to ground as before. Thus the resistance 67 is substituted for the motors 12 and 13 in series with the motors 10 and 11 and the resistance 65 is substituted for the motors 10 and 11 in series with the motors 12 and 13. The motors are now in parallel, each parallel circuit containing two motors and one of the resistances.

In the control circuit, the PSG coil 102 opened its interlock switch 61 and thereby deenergized the KM air coil 31. This causes the brush arms to move from their B positions toward their A positions at a speed controlled by the operation of the CLR relay to maintain constant acceleration current of 129 amperes as previously assumed in its parallel circuit.

As the contact arms leave their B positions, the cam 107 on the controller 39 opens the switch 104 but the PSG coil 102 is energized at reduced current by current from the wire 103 through the 2000 ohm resistance 113 and the PSG interlock switch 114, and from there on through the switch 106 and the PSG coil 102 to the ground wire 21 as before. When the contacts 64 and 66 again reach their A positions, all resistance has been excluded and the motors are connected in two parallel circuits directly across the supply source for the parallel position.

If the master controller 15 is now returned to the series position, the wire 103 and the PSG coil 102 are deenergized. This causes a reverse transition back to the series connection because the deenergization of the PSG coil 102 causes the switch S92 to close and the switches P108 and G109 to open. Also the PSG interlock switch 61 closes to energize the air coil 31 and thereby cause the brushes to move to the B position for operation of the motors in series with no resistance in circuit.

If the master controller 15 is now returned to the switching position, the wire 100 and the air valve coil 31 are deenergized and the contact arms 64 and 66 thereby caused to move to their A positions. When they reach their A positions, the C coil 59 is short circuited by the cam 71 which closes the switch 58 whereby the C73 switch is opened and the resistance 74 reinserted in the circuit. The motors now operate four in series with maximum accelerating resistance in the circuit.

If the master controller 15 is now turned to the off position, the wires 80 and 86 and the LB1 coil 79 and the LB2 coil 87 are deenergized to interrupt the power connections. Also the contact segment 33 closes a circuit for the B coil 36 to establish the braking connections as first described except, however, that if the car is moved at a predetermined braking speed, the braking sequence described later will occur. These braking connections will be discussed in detail under the braking operation.

The sequence of operations described above will occur automatically and correctly whether the master controller is turned slowly from one position to another or quickly to one position. It should be noted, however, that if the master controller 15 is turned quickly from a parallel position to the switching position, the reverse transition will occur immediately without the brush arms moving first to their B positions and then back again to their A positions. Also if the master controller is turned from any position to its off position, the LB1 coil 79 and the LB2 coil 87 are immediately deenergized to interrupt the power circuits.

If the master controller should be turned quickly to the second parallel position, the complete acceleration sequence takes place as described above, but with the operating point of the CLR relay increased to a predetermined value, for example 159 amperes. This is effected by the additional resistance 115 which is inserted by the master controller in this position in series with the CLR coil 97a. Also the transition to parallel occurs before the brush arms 64 and 66 reach their B positions, the wire 116 then being energized and the cam 107 being arranged to close a contact from the wire 116 to the wire 105 before contact is made from wire 103 to wire 105. As a result of this advanced transition, the values of the resistances 65 and 67 are correct to maintain the current through the motors at the higher value of 159 amperes immediately after transition.

Likewise, with the master controller 15 in the third parallel position, the operating point of the CLR relay is raised to a higher value, such as 187 amperes, by the insertion of the resistance 115a in the circuit of the coil 97a and the transition occurs with the brush arms 64 and 66 still further from their B positions when the cam 117 operates to close a circuit from the wire 118 to the wire 105. With the master controller in the fourth parallel position, the CLR coil 97a is deenergized to still further raise the operating point of the relay to, for example, 210 amperes. The transition to parallel occurs with the brush arms still further from their B positions when the cam 117 operates to close a contact from the wire 119 to the wire 105.

If the car should be on a steep grade such that an accelerating current of 210 amperes will not start the car, a higher current may be obtained by momentarily closing the independently operable bypass lever contact 120 on the main controller 15. Current then flows from the reversing switch 14 through the conductor 121, the bypass contact, the conductor 122 and thence through the KM oil coil 27. It will be seen that this bypasses the open switch 22 of the CLR relay. The brush arms will, therefore, be moved to decrease the accelerating resistance as long as the bypass contact 120 is held closed.

Under conditions such that any one of these rates of acceleration causes the wheels to spin because of slippery rail conditions, the movement of the brush arms may be retarded by opening the push button holding switch 24. It is thus possible to obtain a manually controlled acceleration at currents either above or below the currents obtained automatically.

Dynamic braking preliminary spotting operation

As stated, above, the dynamic braking connections are established whenever the master controller is turned to its off position. If the car is moving at a predetermined speed or higher at that time, the motors act as series generators. Assuming that the master controller 15 is thrown to the off position, as shown, and the braking controller is in its off position, as shown, and the vehicle running at a dynamic braking speed, a dynamic braking circuit is established as shown in Fig. 2. This circuit may be traced on Fig. 1 through the motor armature 11, the armature 10, resistance 74, conductor 123, the B4 switch 124, thence through the reversing switch 95 and the fields 96 and 97 to the resistance 125 through this resistance, the B1 switch 86, conductor 93, resistance 65, the S switch 92, resistance 67, the contact arm 66, B2 switch 127 back to the armature 11. In a similar manner, the braking circuit for the armatures 12 and 13 leads from the armature 12 through the resistance 125, the B1 switch 88, the conductor 93, the resistance 65, the S switch 92, the resistance 67, B2 switch 127, the reversing switch 45, the fields 46 and 47, the B3 switch 48, the conductor 49, the conductor 128 back to the armatures 13 and 12.

It will be observed that the current generated by the armatures 10 and 11 excites the series fields 96 and 97 of the motors 12 and 13 while the current generated by the armatures 12 and 13 excites the series fields 46 and 47 of the motors 10 and 11. These two circuits operate in parallel and their output is absorbed principally by a load circuit common to both motor circuits through the resistances 125, 65 and 67. The direction of current flow through the motor fields and the polarity of the armatures is not changed between acceleration and braking. Also in braking, no current flows through the CLR series coil 50 except a small amount of flashing current through the resistance 44, the FF switch and the field windings 46 and 47 to assure quick build-up of the motors as generators. The braking resistance is varied by operation of the KM motor 28.

The braking load resistance in the circuit with the armatures 10 and 11 can be controlled in one relatively large step by closure of the C switch 73 to short circuit the resistance 74. With the C switch 73 open, the resistance 74 in this circuit causes a smaller current in it than in the other braking circuit but the stability of the braking operation is not affected. The result is that the armatures 10 and 11 generate less current but at a higher voltage as compared with the armatures 12 and 13 and correspondingly the fields 46 and 47 of the motors 10 and 11 will be excited at a higher current than the excitation of the fields 96 and 97. Therefore, the effect of inserting one resistance 74 in the one motor braking circuit is approximately equivalent to inserting one-half of this resistance in the common load circuit.

The resistance 125 is of fixed value and is never cut out of the common load circuit. The voltage across this resistance is, therefore, at all times proportional to the total braking current. This voltage is used to control the movement of the brush arms 64 and 66 through the braking relay BR and also under certain conditions to control the operation of the C switch 73 through the medium of the BR relay and the auxiliary relay AR.

As noted above, when these braking connections are established, the closure of the B switch 59a energizes the KM air coil 31 and causes the brush arms to start moving from their A positions to their B positions. The C switch 73 also closes immediately after by the opening of the switch 58 by the cam 71.

As the brush arms move toward their B positions, they reduce the braking load resistance to the point where the motors start generating current. The braking load resistance at which this occurs is approximately proportional to the motor and car speed in accordance with the familiar characteristics of series generators.

Assuming that it is desired first to have the car coast, the braking controller 16 is left in the run and coast position with the air brake valve 76a in its brake released position. In this position, the braking controller closes the switch 130 which energizes the BR coil 131 through this switch and the conductors 132 and 133 across the resistance 125 in series with a 22 ohm resistance 134. The voltage across the resistor 125 when a predetermined low current, such as 20 amperes, flows through the resistor is sufficient to cause the BR coil 131 to pick up its armature, open its switch 25 and thereby deenergize the KM oil coil 27. This stops the KM motor 28. Probably the KM motor will remain at rest until the vehicle coasts to a lower speed. This predetermined spotting braking current of 10 amperes in each motor does not in a typical system generate sufficient braking effort to appreciably retard the speed of the vehicle.

The contact arm 25 of the BR relay has a vibratory action with respect to its lower contact because of the fact that the coil 26 is deenergized when the lower contact is disengaged. Ordinarily the contact arm 25 vibrates without touching its upper contact, this operation being similar to the operation of the CLR switch 22.

At low car speeds, when the braking current does not start to build up until the brush arms approach their B positions, the brush arms may be driven too far because of the inherent delay in the build-up of the motors as generators. Consequently, although the BR relay will operate to stop the brush arms, the current will build up to some value in excess of 20 amperes. If this excessive current is sufficient to pick up the BR contact member 25 to its upper position, a circuit is thereby completed through the wire 135, the AR operating coil 136 and the resistance 20 to the ground wire 21. The AR coil 136 opens its switch 53 thereby deenergizing the C coil 59 and opening the C switch 73. Insertion of the resistance 74 reduces the braking current. At the same time, the AR holding coil 137 is energized by the closure of the AR interlock switch 138 through a 2500 ohm resistor 139 to ground. This holding coil 137 holds the AR relay in its picked up position until the master controller is subsequently turned from the off position to break the control circuit through the segment 33.

The control devices are adjusted so that the resistance 74 reduces the braking current to approximately the normal coasting value of 20 amperes. These operations to obtain a coasting braking current of predetermined low value are termed "spotting." With this adjustment, the motors build up immediately as generators for the dynamic braking operation when it is needed without overshooting.

*Dynamic braking operation*

For the minimum dynamic braking operation, the braking controller 16 is now turned to the dynamic hold position which opens the switch 130 and closes the switch 140. This latter switch bypasses the AR switch 53 to energize the C coil 59 and close the C switch 73, provided, of course, that this coil was deenergized during the spotting operation. In any case, the resistance 74 is immediately short circuited out of the braking load circuit.

The opening of the switch 130 inserts an additional resistance 141 and two ballast resistor lamps 142 in circuit with the BR coil 133. Consequently, increased voltage across the resistance 125 and more braking current must be generated to cause the BR relay to pick up and stop the KM motor 28.

The two ballast resistors 142 are gas filled with incandescent type tungsten filaments and are used as ballast resistors. These resistors have the desirable characteristic of a relatively high positive temperature coefficient of resistance and the ability to operate through a very wide range of temperature. The ratio of the resistance of the filament at a high temperature of approximately 2400 degrees C. to its resistance at 25 degrees C. is approximately 14.7.

Therefore, the BR relay operates to regulate the braking current to a value which is dependent upon the temperature of the filaments. At the instant the braking current starts to build up and before the filaments become heated the relay will regulate to hold a low current value. This current increases rapidly to a higher and stable predetermined value, approximately 80 amperes total current, in a typical system, as the temperature of the filaments rises. This delay introduced by the heating of the filaments is sufficient to prevent overtravel or overshooting of the brush arms by reason of the fact that the relay is thereby caused to start the control of the brush arm movement before the final value of the braking current is built up.

In this dynamic hold position of the braking controller, the air brake valve 76a is closed and no air pressure is admitted to the air brakes. Consequently the air brakes are not applied. As the braking controller 16 is moved farther, however, to the service position or beyond, the air valve 76a is operated to admit air to the air brakes with a pressure dependent upon the position of the braking controller. This air brake air pressure is transmitted from the air brake pipe 143 to a pressure diaphragm 144 which operates through a lever 145 to increase the tension of the spring 146 on the BR relay and thus raise the current operating point of the relay. Up to a predetermined air brake pressure such as 25 pounds per square inch, the operating point of the relay is raised to approximately 180 amperes total braking current. Further movement of the braking controller to increase the braking rate operates the brake valve to apply increasing brake cylinder air pressure but the increased pressure in the diaphragm 144 does not further increase the operating point of the BR relay, because the lever 145 then engages a stop 145a.

The rate of braking may be reduced by moving the braking controller back to a position near the run and coast position. This reduces the air pressure in the pipe 143 and if reduced below the predetermined value of 25 pounds per square inch, reduces the current operating point of the BR relay. While the BR relay can operate only to stop the brush movement, this action causes the braking current to decrease as the speed of the car and motors decreases. When this current decreases to the lower operating point, the relay again permits the brush arms to move and maintain the lower braking current.

If the braking controller is returned as assumed only as far as the dynamic hold position, the air brakes are completely released and the BR relay setting reduced to its 80 ampere value. In the event that the car is on a down grade such that the car speed will not decrease, the BR relay will be picked up to deenergize the KM oil coil 27 and thereby hold the brush arm stationary as long as the braking current exceeds 80 amperes.

This action provides a dynamic holding brake feature. If the downward grade is severe, the car speed will increase slightly until the increased braking current causes the motors to develop sufficient torque to hold a constant speed. The maximum amount of braking current may considerably exceed the 180 ampere value.

The proper procedure in using the dynamic holding brake feature on a down grade is, therefore, the natural one of braking the car down to approximately the speed desired for the grade, the dynamic braking resistance being adjusted automatically to match the speed, and then releasing the air brakes by moving the braking controller back to the dynamic hold position. The car will continue at approximately this speed being held from substantial increasing speed by the dynamic braking current building up to whatever value necessary to overcome the accelerating force of the grade.

If a lower holding speed is desired on the grade, the car speed can be reduced by application of the air brakes and then returning the braking controller to the dynamic hold position.

If, however, it is desired to increase the holding speed, it is necessary to provide power by turning the master controller to the switching position until the car speed is increased to the value desired. This operation is necessary to cause the brush arms to move back toward their A positions and thus increase the value of the braking load resistance.

It will be understood that the air brakes on the vehicle are the principal service or stopping brake while the dynamic braking gives the holding brake feature. The current which is maintained by the BR relay is selected in accordance with the size and operating characteristics of the motors and in accordance with the grades encountered. If, during dynamic braking, the grade becomes so nearly level that the car speed and braking current drop below the operating point of the BR relay, the motor controller operates to reduce the braking resistance and thus maintain the braking current at the operating value. As a result, the car speed is gradually reduced. The operator, upon noting this reduction in car speed will naturally return the braking controller to the run and coast position and thus reduce the motor current to the negligible 20 amperes coasting current.

An overload relay current coil OLR91 is included in the motor circuit and, upon the occurrence of an excessive current during motor operation, opens the relay switch 82 thereby deenergizing the LB1 coil 79. The LB1 switch thereupon opens and deenergizes the motors. Also the switch 82 is held open by the fact that its movable contact is brought into engagement with its upper stationary contact and a circuit thereby closed for its holding coil 148. It is necessary, therefore, to return the master controller 15 to its off-position and thereby deenergize the coil 148 in order to reclose the LB1 switch and reenergize the motors.

Preferably the two resistors 65 and 67 are each mounted on a stationary resistance commutator device having a plurality of conducting segments similar to the segments of a commutator. These segments are connected to intermediate points on the resistor. Each commutator has a rotatably mounted brush bearing on its segments. This brush is connected to the KM motor 28 so as to be rotated around the commutator from a resistance position A to a position B and vice versa.

It will be understood that the values of current, resistance, speed, etc., referred to herein are illustrative only and for typical apparatus. These values are determined by the size and type of apparatus used and the operating conditions desired.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. In a control system for an electric vehicle, the combination of a plurality of driving motors having series field windings, a variable acceleration and dynamic braking resistor means, control motor means for varying gradually said resistor means, a master controller provided with an off position, a series motoring position and a parallel motoring position, connections energized by said master controller when in said off position for connecting said driving motors in parallel circuit with each other to said resistor means for dynamic braking and for operating said control motor means to vary said resistor means, said connections being interrupted when said master controller is moved to a running position and said control motor means being operated to reinsert said resistor means in circuit with said driving motors, and control means operated by said control motor means when said resistor means has been reinserted for closing the circuit of said driving motors for motoring operation in series circuit with each other and in series with said resistor means.

2. In a control system for an electric vehicle, the combination of a plurality of driving motors, a variable acceleration and dynamic braking resistor means, a control motor means for varying gradually said resistor means, a master controller provided with a series motoring position and a parallel motoring position, means responsive to movement of said master controller to one of said motoring positions for energizing said driving motors in series circuit with said resistor means and for operating said control motor means to exclude said resistor means from said series circuit for acceleration of said driving motors, means driven by said control motor means for connecting said driving motors in parallel with each other for motoring operation when different portions of said resistor means have been excluded from said series circuit and with said excluded portion included in said parallel circuits, and means selectively responsive to the parallel position of said master controller for determining the amounts of said resistor means included in said parallel connections.

3. In a control system for an electric vehicle, the combination of a plurality of driving motors having series field windings, a pair of variable acceleration and dynamic braking resistors, control motor means for varying gradually said resistors, a master controller provided with a series motoring position and a plurality of parallel motoring positions, means responsive to movement of said master controller to one of said motoring positions for energizing said driving motors in series circuit with said resistors and for operating said control motor means to exclude said resistors from said series circuit for acceleration of said driving motors, means driven by said control motor means for connecting said driving motors in parallel with each other for motoring operation when different portions of said resistors have been excluded from said series circuit and with said excluded portions included in said parallel circuits, and means selectively responsive to a parallel position of said master controller for determining the amounts of said resistors included in said parallel connections.

4. In a control system for an electric vehicle, the combination of a plurality of driving motors having series field windings, a variable acceleration and dynamic braking resistor means, control motor means for varying gradually said resistor means, a master controller provided with an off position, a series motoring position and a parallel motoring position, connections energized by said master controller when in said off position for connecting said driving motors in parallel with each other to said resistor means for dynamic braking and for operating said control motor means to vary said resistor means, said connections being interrupted when said master controller is moved to one of said running positions and said control motor means being operated to reinsert said resistor means in circuit with said driving motors, control means operated by said control motor means when said resistor means has been reinserted for closing the circuit of said driving motors for motoring operation in series circuit with each other and in series with said resistor means, and means responsive to the position of said master controller for thereupon reversing said control motor means to exclude said resistor means from said series circuit for acceleration of said driving motors.

5. In a control system for an electric vehicle, the combination of a plurality of driving motors having series field windings, a pair of variable acceleration and dynamic braking resistors, control motor means for varying gradually variable resistors, a master controller provided with an off position, a series motoring position and a plurality of parallel motoring positions, connections energized by said master controller when in said off position for connecting said driving motors in parallel with each other to said resistors for dynamic braking and for operating said control motor means to vary said resistors, said connections being interrupted when said master controller is moved to one of said running positions and said control motor being operated to reinsert said resistors in circuit with said driving motors, control means operated by said control motor means when said resistors have been reinserted for closing the circuit of said driving motors for motoring operation in series circuit with each other and in series with said resistors, means responsive to the position of said master controller for thereupon reversing said control motor means to exclude said resistors from said series circuit for acceleration of said driving motors, means driven by said control motor means for connecting said driving motors in parallel with each other for motoring operation when different portions of said resistors have been excluded from said series circuit and with said excluded portions included in said parallel circuits, and means selectively responsive to a parallel position of said master controller for determining the amounts of said variable resistors included in said parallel connections.

6. In a control system for an electric vehicle, the combination of a plurality of driving motors having series field windings, a pair of variable acceleration and dynamic braking resistors, a third resistor, a control motor for varying gradually said variable resistors and for short circuiting said third resistor, a main controller provided with an off position, a series motoring position and a plurality of parallel motoring positions, connections energized by said master controller when in said off position for connecting said driving motors in parallel circuit with each other to said resistors for dynamic braking and for operating said control motor to short circuit said third resistor and vary said variable resistors, means responsive to the current in said dynamic braking circuit for controlling said control motor to maintain a predetermined braking current, said connections being interrupted when said master controller is moved to a running position and said control motor being operated to reinsert said resistors in circuit with said driving motors, control means operated by said control motor when said resistors have been reinserted for closing the circuit of said driving motors for motoring operation in series circuit with each other and in series with said resistors, means responsive to the position of said master controller for thereupon reversing said control motor to exclude said resistors from said series circuit for acceleration of said driving motors, means responsive to the current in said motor circuit for controlling said control motor to maintain a predetermined motoring current, means driven by said control motor for connecting said driving motors in parallel with each other for motoring operation when different portions of said variable resistors have been excluded from said series circuit and with said excluded portions included in said parallel circuits, and means selectively responsive to the parallel position of said controller for determining the amounts of said resistors included in said parallel connections.

7. In a control system for an electric vehicle, the combination of a driving motor, a variable dynamic braking resistor, control motor means for varying said resistor, means for connecting said resistor in circuit with said driving motor for dynamic braking, a braking controller, current responsive control means responsive to movement of said braking controller to one position for controlling said control motor means in response to the current in said braking circuit to maintain a predetermined low current in said driving motor giving no substantial braking effort, and means operated by movement of said braking controller to a second position for causing said current responsive means to increase gradually said dynamic braking current.

8. In a control system for an electric vehicle, the combination of a driving motor, a variable acceleration and dynamic braking resistor, control motor means for varying gradually said resistor, a master controller movable to connect said driving motor for motoring operation and to control said control motor means to accelerate said driving motor, means responsive to movement of said master controller to a predetermined position for connecting said resistor in circuit with said driving motor for dynamic braking, a braking controller, means responsive to movement of said braking controller to one position for controlling said control motor in response to the current in said braking circuit to maintain a predetermined low current in said driving motor giving no substantial braking effort, and timing means operated by movement of said braking controller to a second position for increasing gradually said dynamic braking current.

9. In a control system for an electric vehicle, the combination of a driving motor, a variable acceleration and dynamic braking resistor, a control motor for varying gradually said resistor, a master controller movable to connect said driving motor for motoring operation and to control said control motor to accelerate said driving motor, means responsive to movement of said master controller to a predetermined position for connecting said resistor in circuit with said driving motor for dynamic braking, a relay responsive to the current in said braking circuit for controlling said control motor, a braking controller, means operated by movement of said braking controller to one position for adjusting the current setting of said relay to maintain a predetermined low current in said driving motor giving no substantial braking effort, and variable resistance timing means operated by movement of said braking controller to a second position for increasing gradually the current setting of said relay to increase thereby said dynamic braking current.

10. In a braking control system for an electric vehicle, the combination of a driving motor, a variable dynamic braking resistor for said motor, means for connecting said braking resistor in a dynamic braking circuit with said motor, means responsive to the current in said braking circuit for adjusting the amount of said braking resistor included in said braking circuit to maintain a predetermined low dynamic braking current giving no substantial braking effort, and means for adjusting said current responsive means to maintain the current in said braking circuit at a predetermined higher value at which the speed of the vehicle is maintained substantially at a predetermined value.

11. In a braking control system for an electric vehicle, the combination of a driving motor, a variable dynamic braking resistor, a second resistor, means for connecting said resistors in circuit with said driving motor to maintain a predetermined low current in said driving motor giving no substantial braking effort, and means for disabling said second resistor to initiate dynamic braking operation.

12. In a braking control system for an electric vehicle, the combination of a driving motor, a variable dynamic braking resistor, a second resistor, control motor means for varying said braking resistor, means for connecting said resistors in circuit with said driving motor for dynamic braking, a braking controller, current responsive control means responsive to movement of said braking controller to one position for controlling said control motor means in response to the current in said braking circuit to maintain a predetermined low current in said driving motor giving no substantial braking effort, and means operated by movement of said braking controller to a second position for disabling said second resistor for dynamic braking operation.

13. In a braking control system for an electric vehicle, the combination of a driving motor, a variable dynamic braking resistor, a second resistor, control motor means for varying said braking resistor, means for connecting said resistors in circuit with said driving motor for dynamic braking, a braking controller, current responsive control means responsive to movement of said braking controller to one position for controlling said control motor means in response to the current in said braking circuit to maintain a predetermined low current in said driving motor giving no substantial braking effort, and means operated by movement of said braking controller to a second position for disabling said second resistor for dynamic braking operation and for causing said current responsive means to increase gradually said dynamic braking current.

14. In a braking control system for an electric vehicle, the combination of a driving motor, a variable dynamic braking resistor, a second resistor, control motor means for varying said braking resistor, means for connecting said resistors in series circuit with said driving motor for dynamic braking, a braking controller, current responsive control means responsive to movement of said braking controller to one position for controlling said control motor means in response to the current in said braking circuit to maintain a predetermined low current in said driving motor giving no substantial braking effort, means operated by movement of said braking controller to a second position for disabling said second resistor for dynamic braking operation, and timing means responsive to movement of said braking controller for causing said current responsive means to increase gradually said dynamic braking current to a predetermined value.

15. The combination in an electric vehicle drive system of a plurality of driving motors for said vehicle, a controller for controlling the series and parallel connections of said motors with each other, an acceleration resistor for said motors, a control device for said resistor movable from one position to a second position to exclude gradually said resistor from the motor circuit during series operation of said motors and movable from said second position back to said first position to exclude gradually said resistor from the motor circuit during parallel operation of said motors, means responsive to the position of said controller for operating said control device, and means responsive to movement of said controller quickly from a starting position to a parallel position for establishing the parallel motor connections before said control device reaches said second position.

16. In a control system for an electric vehicle, the combination of a driving motor, a variable dynamic braking resistor for said motor, means for connecting said braking resistor in a dynamic braking circuit with said motor, and means responsive to the current in said braking circuit when said vehicle is traveling at a predetermined speed for decreasing the amount of said braking resistor included in said braking circuit until the current in said braking circuit is increased to a predetermined value whereby said resistor dynamically brakes the vehicle so as to maintain the speed of the vehicle substantially at said predetermined speed when the vehicle is traveling on a down grade.

17. In a control system for an electric vehicle, the combination of a driving motor, a variable dynamic braking resistor for said motor, motor means for varying said braking resistor, means for connecting said braking resistor in a dynamic braking circuit with said motor, means for controlling said driving motor to operate said vehicle at a desired one of a plurality of speeds, and means responsive to the current in said braking circuit for controlling said motor means when said vehicle is traveling at said desired speed to decrease the amount of said braking resistor included in said braking circuit until the current in said braking circuit is increased to a predetermined value which is the same for each of said plurality of speeds whereby said resistor dynamically brakes the vehicle so as to maintain the speed of the vehicle substantially at said predetermined speed when the vehicle is traveling on a down grade.

18. In a control system for an electric vehicle, the combination of a driving motor, a variable dynamic braking resistor for said motor, means for connecting said braking resistor in a dynamic braking circuit with said motor, means responsive to the current in said braking circuit when said vehicle is traveling at a predetermined speed for adjusting the amount of said braking resistor included in said braking circuit so as to provide a predetermined low dynamic braking current giving no substantial braking effort, and means for adjusting said current responsive means to maintain the current in said braking circuit at a predetermined higher value at which the speed of the vehicle is maintained substantially at a predetermined value when said vehicle is traveling on a down grade.

HAROLD G. MOORE.